(12) United States Patent
Yan (10) Patent No.: US 10,440,479 B2
(45) Date of Patent: Oct. 8, 2019

(54) ELECTROACOUSTIC DEVICE AND MOBILE TERMINAL

(71) Applicant: GUANGDONG OPPO MOBILE TELECOMMUNICATIONS CORP., LTD., Dongguan, Guangdong (CN)

(72) Inventor: Bixiang Yan, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/998,978

(22) Filed: Aug. 17, 2018

(65) Prior Publication Data

US 2019/0082265 A1    Mar. 14, 2019

(30) Foreign Application Priority Data

Sep. 8, 2017  (CN) .......................... 2017 1 0814618
Sep. 8, 2017  (CN) ..................... 2017 2 1159596 U (51) Int. Cl.
*H04R 1/28* (2006.01)
*H04R 1/02* (2006.01)
(Continued)

(52) U.S. Cl.
CPC ............ *H04R 9/063* (2013.01); *H04M 1/035* (2013.01); *H04R 1/2811* (2013.01); *H04R 1/021* (2013.01);
(Continued)

(58) Field of Classification Search
CPC . H04R 1/28; H04R 1/02; H04R 1/025; H04R 1/026; H04R 9/00
(Continued)

(56) References Cited

U.S. PATENT DOCUMENTS 3,690,405 A    9/1972  Hance
4,127,751 A    11/1978 Kinoshita
(Continued)

FOREIGN PATENT DOCUMENTS

CN    201435742 Y    3/2010
CN    103237280 A    8/2013
(Continued)

OTHER PUBLICATIONS

International search report for Application No. PCT/CN2018/101811, dated Nov. 28, 2018 (11 pages).
(Continued)

*Primary Examiner* — Suhan Ni
(74) *Attorney, Agent, or Firm* — Ladas & Parry LLP (57) ABSTRACT

An electroacoustic device and a mobile terminal are provided. The electroacoustic device may include a box defining an opening; an electroacoustic component including a frame, a vibrating membrane and a driving assembly, whet the frame is installed inside the box, the vibrating membrane is assembled on the thine and covers the opening, the frame and the vibrating membrane define a chamber, the driving assembly is configured to drive the vibrating membrane to vibrate, and the frame defines a leaking channel, and partition nets set inside the box, wherein a space between the electroacoustic component and the box is divided into cavities by the partition nets, at least one cavity is filled with sound absorption material, and the cavities are communicated with the chamber through the leaking channel.

20 Claims, 5 Drawing Sheets

(51) Int. Cl.
*H04R 9/00* (2006.01)
*H04R 9/06* (2006.01)
*H04M 1/03* (2006.01)
*H04R 9/02* (2006.01)

(52) U.S. Cl.
CPC ............... *H04R 9/025* (2013.01); *H04R 9/06* (2013.01); *H04R 2201/029* (2013.01); *H04R 2400/11* (2013.01); *H04R 2499/11* (2013.01)

(58) Field of Classification Search
USPC .................. 381/351–354, 386, 392, 396
See application file for complete search history.

(56) References Cited

U.S. PATENT DOCUMENTS 4,439,644 A * 3/1984 Bruney, III .......... G10K 11/002
　　　　　　　　　　　　　　　　　　　　181/151

| | | |
|---|---|---|
| 2007/0140518 A1 | 6/2007 | Larsen |
| 2017/0070812 A1 | 3/2017 | Paris et al. |
| 2017/0164096 A1 | 6/2017 | Herold et al. |
| 2017/0195781 A1* | 7/2017 | Kang ................. B01J 20/18 |

FOREIGN PATENT DOCUMENTS

| | | |
|---|---|---|
| CN | 2014180268 U | 2/2015 |
| CN | 204906679 U | 12/2015 |
| CN | 107454529 A | 12/2017 |
| CN | 207410517 U | 5/2018 |
| WO | WO2006016321 A2 | 2/2006 |
| WO | WO2017024987 A1 | 2/2017 |

OTHER PUBLICATIONS

European search repot for Application No. EP18188905.6, dated Jan. 21, 2019 (8 pages).

* cited by examiner

ELECTROACOUSTIC DEVICE AND MOBILE TERMINAL

CROSS-REFERENCE TO RELATED APPLICATIONS

The present application claims foreign priority of Chinese Patent Applications No. 201721159596.5, field on Sep. 8, 2017 and No. 201710814618,5, field on Sep. 8, 2017 in the State intellectual Property Office of China, the entire contents of which are hereby incorporated by reference.

TECHNICAL FIELD

The present disclosure generally relates to the electronic device field, and in particular to an electroacoustic device and a mobile terminal.

BACKGROUND

An electroacoustic device generally includes a box which defines a cavity and an electroacoustic component installed in the cavity. To improve the sound effect of an electroacoustic device, sound absorption material may be encapsulated and then assembled in the cavity of the electroacoustic device. Thanks to the sound absorption material, when the electroacoustic component receives a control signal and generates sound, the pressure fluctuations at the cavity of the device may be suppressed such that the sound generation effect may be improved.

However, in this circumstance, the amount of sound absorption material is limited by the encapsulated structure, and modifications and improvements except for changing the site of the encapsulated structure or the type of sound absorption material are hard to make. Thus, the sound effect of the electroacoustic device is still limited.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present disclosure without creative efforts shall fall within the protection scope of the present disclosure.

Figure 1:
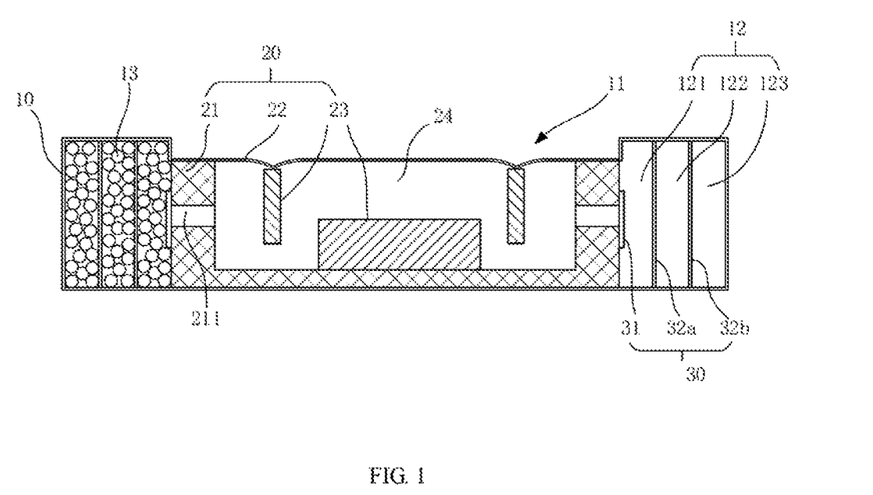
FIG. 1 is a schematic section view of an electroacoustic device according to an embodiment of the present disclosure.

Referring to FIG. 1, FIG. 1 is a schematic section view of an electroacoustic device according to an embodiment of the present disclosure. As shown in the figure, the electroacoustic device may include a box 10, an electroacoustic component 20 and a number of partition nets 30.

The box 10 may define an opening 11. In this embodiment, the opening 11 is located at the middle of the top side of the box 10. It should be understood that the opening 11 may be located at other positions.

The electroacoustic component 20 may include a frame 21, a vibrating membrane 22 and a driving assembly 23. The frame 21 may be installed inside the box 10. The vibrating membrane 22 may be assembled on the frame 21. The vibrating membrane 22 may cover the opening 11 such that the space within the box 10 and the vibrating membrane 22 may be a sealed space. The frame 21 and the vibrating membrane 22 may cooperatively define a chamber 24, i.e., the space within the frame 21 and the vibrating membrane 22. The driving assembly 23 may be disposed in the chamber 24. The driving assembly 23 may he utilized to drive the vibrating membrane 22 to vibrate. The frame 21 may define a leaking channel 211 passing through the frame 21. The leaking channel 211 may be a through hole or a through slot, and the leaking channel 211 may be communicated with the chamber 24. Therefore, some of sound waves or air flow generated by the vibration of the vibrating membrane 22 may get out from the chamber 24 through the leaking channel 211.

Figure 3:
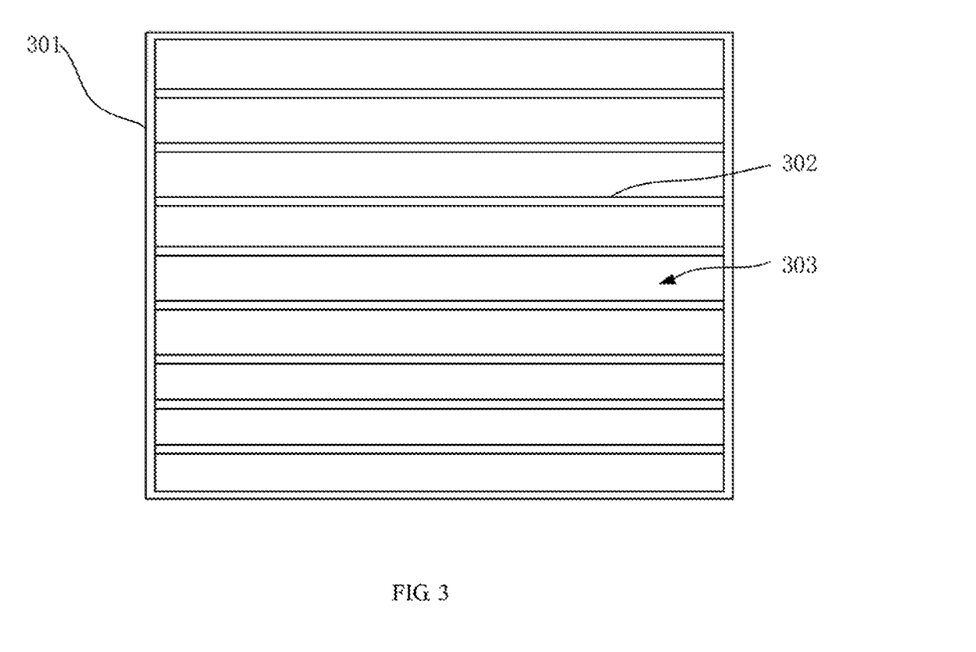
FIG. 3 is a schematic structural diagram of a partition net according to an embodiment of the present disclosure.

The multiple partition nets 30 may be set inside the box 10 and outside the chamber 24, that is, the partition nets 30 may be in the space between an outer wall of the frame 21 and an inner wail of the box 10. The space between the frame 21 and, the box 10 may be divided into a number of cavities 12 by the partition nets 30. For example, in FIG. 1, there are three partition nets 30 (31, 33a and 32b) and three cavities 12 (121, 122 and 123). Those skilled in the art should understand that the number of the partition nets 30 and the cavities 12 may be determined based on the design of the electroacoustic device and will not be limited hereon. At least one of the cavities 12 may be filled with sound absorption material 13. It should be understood, in order to clearly illustrate the structure of the electroacoustic device, the absorption material 13 is only shown in the left side of the device in FIG. 1, and it does not mean that the cavities 121~123 as illustrated in FIG. 1 are not filled with sound absorption material 13. For example, in one embodiment, all of the cavities 12 may be filled with sound absorption material 13. In another embodiment, only some of the cavities 12 may be filled with sound absorption material 13. Each of the partition nets 30 may define a number of net holes 303 as shown in FIG. 3. Since each of the partition nets 30 has net holes 303 on it, the cavities 12 may all be communicated with the chamber 24 through the leaking channel 211.

Optionally, each of the net holes 303 of each partition net 30 may, be small enough to prevent sound absorption material 13 from passing through the net holes 30. Specifically, the net holes 303 of each of the partition nets 30 may be smaller than the particle size of the sound absorption material 13 in adjacent cavity 30 or cavities 30. For example, the net holes 303 of the partition net 31 may be smaller than the particle size of the sound absorption material 13 (if exist) in the cavity 121, and the net holes 303 of the partition net 32a may be smaller than the particle size of the sound absorption material 13 (if exist) in the cavities 121 and 122. Thus, the sound absorption material 13 can be kept in each of the cavities 30 and will not be mixed. Besides, no sound absorption material 13 will enter the chamber 24 through the leaking channel 211 such that the electroacoustic component 20 may operate normally.

According to this embodiment, the partition nets 30 may be set in the box 10 to divide an inner space of the box 10 into a number of cavities 12, and at least one of these cavities 12 may be filled with sound absorption material 13. That is to say, the electroacoustic device of the present disclosure may allow the user or the designer of the device to decide to till sound absorption material 13 in which ones of the cavities 30. Thus, different modification and improvement of the sound absorption structure may be realized upon the device, which may help improve the sound generation effect of the electroacoustic device.

Optionally, the box 10 may be made of plastic, metal or other materials. The outlines of the box 10 may be a rectangular shape, a circular shape or an irregular shape. The opening 11 on the box 10 may have a circular configuration, an elongated configuration and the like.

Optionally, the frame 21 of the electroacoustic component 20 may be made of plastic, metal or other materials. The outlines of the frame 21 may be a rectangular shape, a circular shape, a polygonal shape or an irregular shape.

Optionally, the vibrating membrane 22 of the electroacoustic component 20 may be made of paper, fiber material, metal, wool or silk. In some embodiments, a wrinkle (not labeled) may be formed on the vibrating membrane 22 which extends along a circumference direction of the vibrating membrane 22. The wrinkle may be utilized to reduce the tension of the vibrating membrane 22 so as to facilitate the vibration of the middle part of the vibrating membrane.

Optionally, the sound absorption material 13 may be sound absorption particles. The sound absorption particles may be light and porous. For example, the sound absorption material 13 may be at least one of foam balls, activated carbon, zeolite etc. As described above, the particle size or the particle diameter of the sound absorption material 13 may be larger than the net holes of the partition net(s) 30 located next to it such that the sound absorption particles wilt not pass through the net holes of the partition net(s) 30.

Referring to FIG. 1, in one embodiment, the partition nets 30 may include a first partition net 31 and at least one second partition net, e.g., two partition nets 32a~32b. The first partition net 31 is closer to the frame 21 compared with the second partition nets 32a~32b. The first partition net 31 may coat the frame 21. In this embodiment, the edge of the first partition net 31 may be fixed on the frame 21 and around the leaking channel 211, such that the first partition net 31 may cover the leaking channel 211. In other embodiment, the first partition net 31 may alternatively cover the whole outer surface of the frame 21, and naturally it also covers the leaking channel 211 in this case. The person of ordinary skill in the art should understand that although the first partition net 31 covers the leaking channel 211, the first partition net 31 will not block the air flow or sound waves exiting from the chamber 24 because of the existence of the net holes 303. Instead, the first partition net 31 may prevent sound absorption material 13 from entering the chamber 24 through the leaking channel 211.

Figure 2:
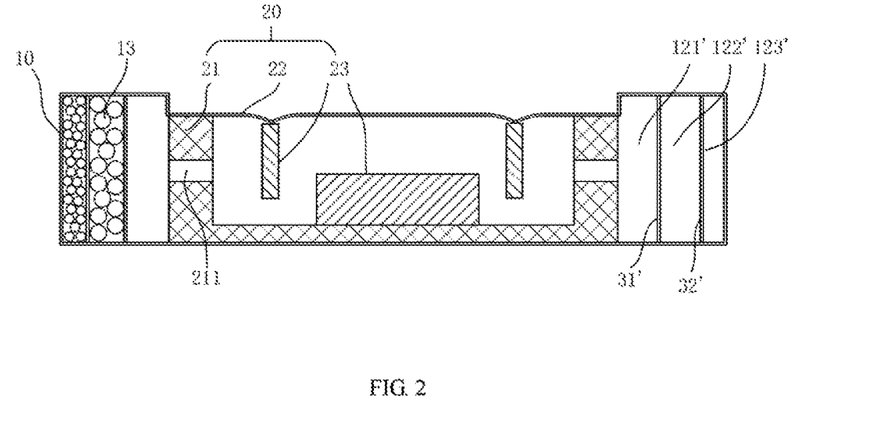
FIG. 2 is a schematic section view of an electroacoustic device according to another embodiment of the present disclosure.

Referring to FIG. 2, in another embodiment, the first partition net 31' may be spaced apart from the frame 21, and the second partition net 32' may be disposed between the first partition net 31' and a side wail of the box 10. In this case, a cavity 121' may be defined between the frame 21 and the first partition net 31' in which no sound absorption material 13 may be filled. Instead, sound absorption material 13 may be filled in the cavitites 122' and 123' defined between the first artition net 31' and the side wall of the box 10.

In one embodiment, the size of the net boles 303 of one of the partition nets 30 which is closer to the frame 21 may be larger than the size of the net holes 303 of the others of the partition nets 30 farther from the frame 21. For example, in FIG. 1, the partition net 31 is closer to the frame 21 than the partition net 32a, and the partition net 32a is closer to the frame 21 than the partition net 32b. Accordingly, the net holes 303 of the partition net 31 may be larger than the net holes 303 of the partition net 32a, and the net holes 303 of the partition net 32a may be larger than the net holes 303 of the partition net 32b. In this circumstance, sound absorption material 13 with large particle size may be filled in the cavities 30 closer to the frame 21, e.g., the cavity 121, while sound absorption material 13 with small particle size may be filled in the cavities 30 farther from the frame 21, e.g., the cavity 123.

Referring to FIG. 3, in one embodiment, each of the partition nets 30 may include a support 301 and a number of bars 302. The support 301 may be fixed to the box 10 and utilized to support other structures of the partition nets 30. The support 301 and the bars 302 may cooperatively define the net holes 303 described above. In this case, the net holes 303 may have an elongated configuration. The distance between each two adjacent bars 302 may be smaller than the particle size (particle diameter) of the sound absorption material 13 in adjacent cavities 30 such that no sound absorption material 13 will pass through the net holes 303. It should be understood that FIG. 3 only shows an exemplary structure of the partition net 30. In other embodiments, for instance, the partition nets 30 may each define an array of boles alternatively. Optionally, the partition nets 30 may be made of cloth, plastic, metal or other materials.

The multiple partition nets 30 may either have similar or different structures based on design requirement. In one embodiment, an extending direction of the bars 302 of different partition nets 30 may be substantially the same. Specifically, supposing that the electroacoustic device is disposed horizontally, the bars 302 of each of the partition nets 30 may all extend along the horizontal direction or the vertical direction. In this circumstance, air flow or sound waves propagating in the cavities 30 may pass through the net hole 30 more smoothly.

Figure 4A:
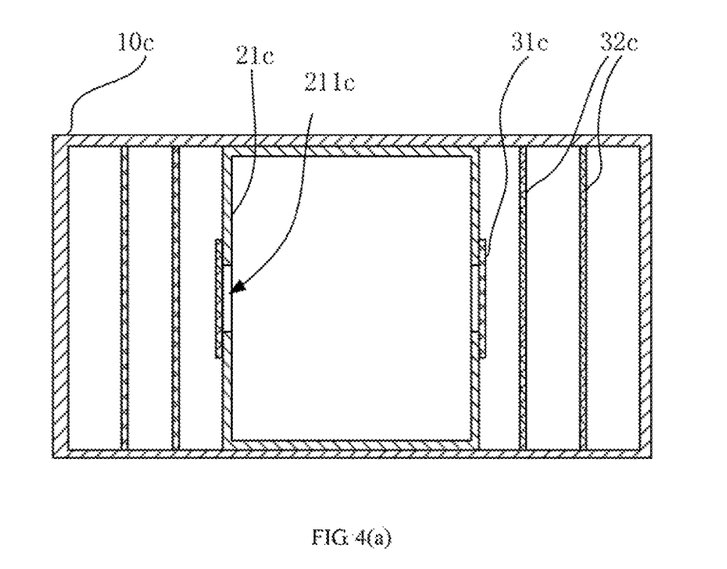
FIGS. 4(a) and (b) show schematic section views of an electroacoustic component taken from another direction according to different embodiments of the present disclosure.
Figure 4B:
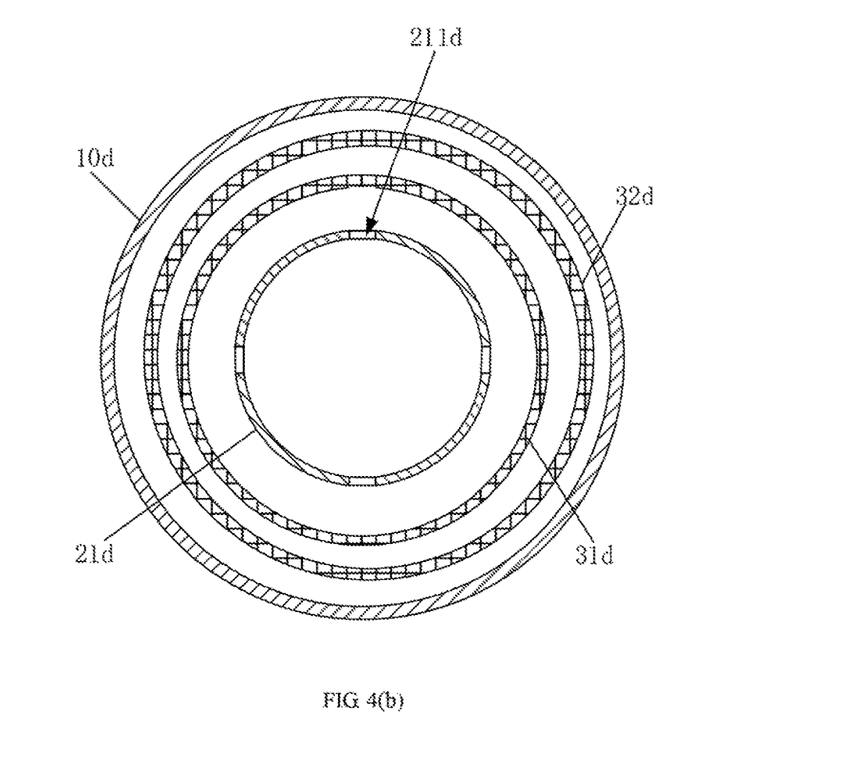

Referring to FIGS. 4(a) and 4(b), FIGS. 4(a) and 4(b) show schematic section views of an electroacoustic component taken from another direction according to different embodiments of the present disclosure.

In one embodiment, as shown in FIG. 4(a), the partition nets 31c~32c may each has a plate configuration. The partition nets 31c~32c may be spaced apart from each other and arranged in parallel from the frame 21*c* to the box 10*c*. In this embodiment, the partition nets 31*c*~32*c* may be substantially perpendicular to a bottom wall of the box 10*c*. Optionally, in this embodiment, the outlines of the box 10*c* may be a rectangular shape as well as that of the frame 21*c*. The first partition net 31*c* may be attached onto the frame 21*c* to cover the leaking channel 211*c*. In another embodiment, as shown in FIG. 4(*b*), the outlines of the box 10*d* may be a circular shape as well as that of the frame 21*d* and the partition nets 31*d*~32*d*. The closest partition net to the frame 21*d*, i.e., the first partition net 31d, may be spaced apart from the frame 21*d*. Thus, the first partition net 31*d* may not directly cover the leaking hole 211*d*. In this case, the cavity between the frame 21*d* and the first partition net 31*d* may not filled with sound absorption material 13, that is, the cavity between the frame 21*d* and the first partition net 31*d* may be an empty space. The person skilled in the art should understand that the technical features of each of the embodiments may be applied in other embodiment, as long as the function of the electroacoustic device may be achieved. For example, if partition nets are disposed in a circular box, the partition nets may still have a plate configuration and be disposed in parallel.

In some embodiments, the cavities 121~123 may have the same volume as illustrated FIG. 1. In other embodiments, the cavities 121'~123' may have different volumes as illustrated in FIG. 2.

In some embodiments, different cavities 121~123 or 121'~123' may be filled with same types of sound absorption material 13. In other embodiments, different cavities 121~123 or 121'~123' may be filled with different types of sound absorption materials 13.

In some embodiments, different cavities 121~123 may be filled with sound absorption material 13 with the same particle size as illustrated in FIG. 1. In other embodiments, different cavities 121'~123' may be filled with sound absorption material 13 with different particle sizes as illustrated in FIG. 2.

Figure 5A:
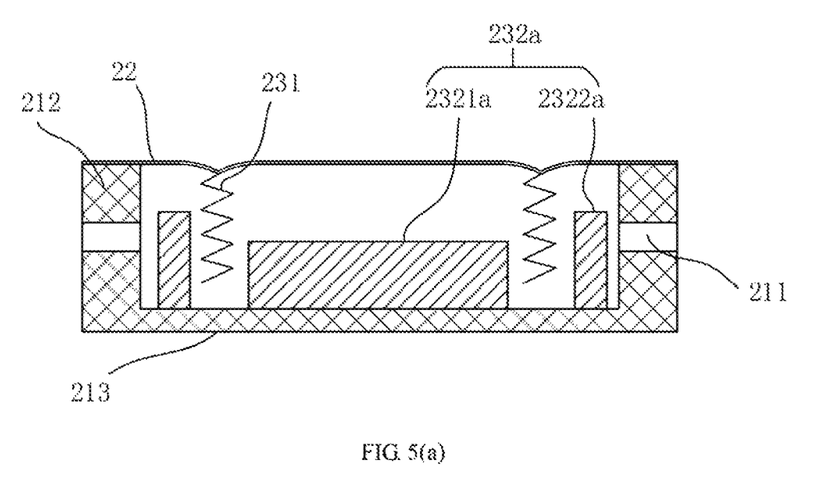
FIGS. 5(a) and (b) show schematic section views of an electroacoustic component according to different embodiments of the present disclosure.
Figure 5B:
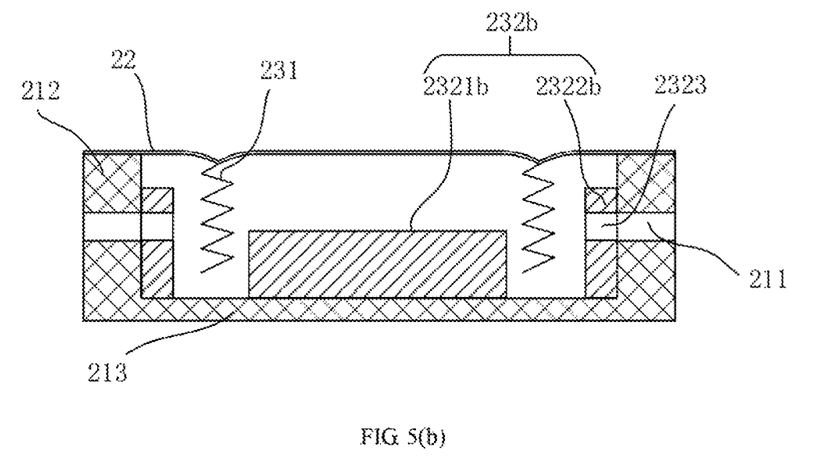

Referring to FIGS. 5(*a*) and 5(*b*). FIGS. 5(*a*) and 5(*b*) show schematic section views of an electroacoustic component according to different embodiments of the present disclosure.

The frame 21 may include a side wall 212 and a bottom wail 213. The bottom wall 213 may be connected to the box 10 (as shown in FIG. 1), and the leaking channel 211 may be defined in the side wall 212.

In one embodiment, the driving assembly 23 may include a first driving component 231 connected to the vibrating membrane 22 and a second driving component 232*a* or 232*b* connected to the frame 21. The second driving component 232*a* or 232*b* may be utilized to drive the first driving component 231 to vibrate so as to drive the vibrating membrane 22 to vibrate and generate sound waves.

Optionally, the first, driving component 231 may be a coil while the second driving component 232*a* or 232*b* may be a magnet. It should be understood that in some embodiments the first driving component 231 may be a magnet while the second driving component 232*a* or 232*b* may be a coil. The second driving component 232*a* or 232*b* may include a first part 2321*a* or 2321*b* and a second part 2322*a* or 2322*b*. The first part 2321*a* or 2321*b* may be connected to the bottom wall 213 of the frame 21 while the second part 2322*a* or 2322*b* may be disposed around and spaced apart from the first part 2321*a* or 2321*b* to form a magnetic gap (not labeled). The first driving component 231 may extend from the vibrating membrane 22 into the magnetic gap.

In one embodiment, as shown in FIG. 5(*a*), the second part 2322*a* may be spaced apart from the side wall 212 of the frame 21. An end, i.e., the bottom end, of the second part 2322*a* may be connected to the bottom wall 213 of the frame 21 while another end, i.e., the top end, of the second part 2322*a* may be spaced apart from the vibrating membrane 22 such that a channel may be formed which allows the air to flow from a middle part oldie chamber 24 to the leaking channel 211.

In another embodiment, as shown in FIG 5(*b*), the second part 2322*b* may be clung to the side wall 212 of the frame 21, and the second part 2322*b* may define a through hole 2323 which is aligned and communicated with the leaking channel 211. Thus, air in the chamber 24 may flow into the leaking channel 211 through the through hole 2323.

Figure 6:
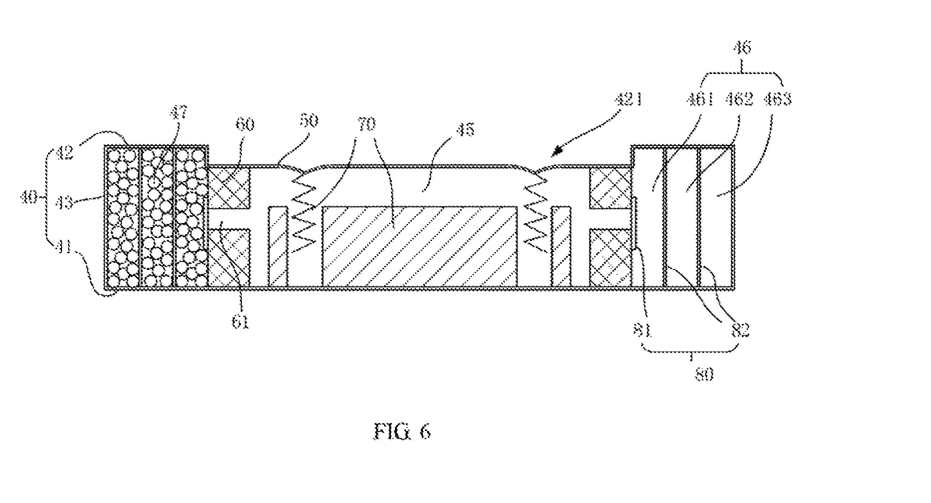
FIG. 6 is at schematic section view of an electroacoustic device according to another embodiment of the present disclosure.

Referring to FIG. 6, FIG. 6 is a schematic section view of an electroacoustic device according to another embodiment of the present disclosure. As shown in FIG. 6, the electroacoustic device may include a box 40, a vibrating membrane 50, a frame 60, a driving assembly 70 and a number of partition nets 80.

The box 10 may have a bottom wall 41, a top wall 42 and a side wall 43. The top wall 42 may define an opening 421. The vibrating membrane 50 may be connected to the top wall 42 of the box 40, and the vibrating membrane 50 may cover the opening 421 such that the vibrating membrane 50 and the box 40 may define a sealed spaced inside. The frame 60 may be installed on the bottom wall 41 of the box 40. The frame 60, the bottom wall 41 of the box 40 and the vibrating membrane 50 may cooperatively define a chamber 45. The frame 60 may define a leaking channel 61 which is communicated with the chamber 45. The driving assembly 70 may be installed in the chamber 45 and be utilized to drive the vibrating membrane 50 to vibrate. The partition nets 80 may be set inside the box 40 and outside the chamber 45. The partition nets 80, the top wall 42, the bottom wall 41 and the side wall 43 may cooperatively define a number of cavities 46 (461~463). At least one of the cavities 46 may be filled with sound absorption material 47. Each of the partition nets 80 may define a number of net holes which allow air to pass but blocks the sound absorption material 47. Specifically, the net holes of each of the partition nets 80 may be small enough to prevent the sound absorption material 47 from passing through the plurality of net holes. The cavities 46 away be communicated with the chamber 45 through the leaking channel 61.

The structure and configuration of the box 40, the vibrating membrane 50, the frame 60, the driving assembly 70 and/or the partition nets 80 may be same or similar as the box 10, the vibrating membrane 22, the frame 21, the driving assembly 23 and/or the partition nets 30 as described in above embodiments and will not he described hereon for simplicity and clarity.

Figure 7:
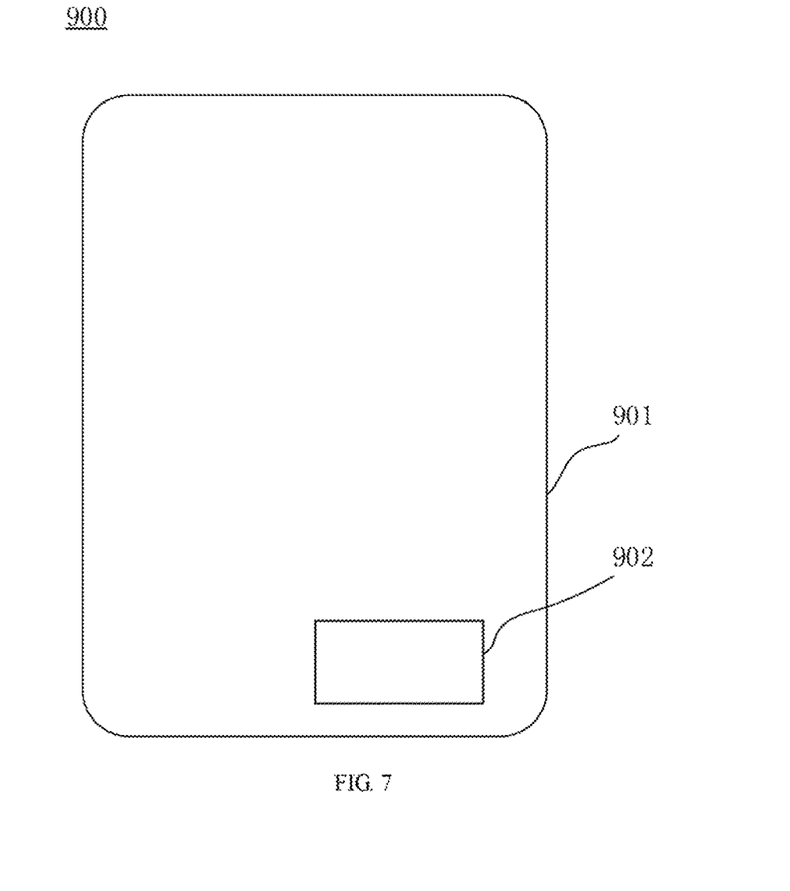
FIG. 7 is a schematic structural diagram of a mobile terminal according to an embodiment of the present disclosure.

Referring to FIG. 7, FIG. 7 is a schematic structural diagram of a mobile terminal according to an embodiment of the present disclosure.

As shown in the figure, the mobile terminal 900 may include a body 901 and an electroacoustic device 902 set inside the body 901. The electroacoustic device 902 may have a specific structure as described in anyone of the above embodiments.

Those skilled in the art should understand that, the electroacoustic device 902 may be positioned differently in the body 901. For example, it may be disposed close to the top end, the bottom end or the side of the mobile terminal, which is not limited in the preset disclosure.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. An electroacoustic device, comprising:
a box defining an opening;
an electroacoustic component comprising:
    a frame installed inside the box and defining a leaking channel passing through the frame;
    a vibrating membrane assembled on the frame and covering the opening, wherein the frame and the vibrating membrane cooperatively define a chamber communicated with the leaking channel; and
    a driving assembly disposed in the chamber and configured to drive the vibrating membrane to vibrate; and
a plurality of partition nets set inside the box and outside the chamber, wherein a space between the frame and the box is divided into a plurality of cavities by the plurality of partition nets, at least one or the plurality of cavities is filled with sound absorption material, each of the plurality of partition nets defines a plurality of net holes, and the plurality of cavities are communicated with the chamber through the leaking channel.

2. The electroacoustic device of claim 1, wherein
the plurality of partition nets comprises a first partition net and at least one second partition net, the first partitions net is closer to the frame compared with the at least one second partition net;
the first partition net coats the frame, or the first partition net is spaced apart from the frame.

3. The electroacoustic device of claim 1, wherein
a size of each of the plurality of net holes of one of the plurality of partition nets closer to the frame is larger than a size of each of the plurality of net holes of other ones of the plurality of partition nets farther from the frame; and
a particle size of the sound absorption material filled in one of the plurality of cavities closer to the frame is larger than a particle size of the sound absorption material filled in other ones of the plurality of cavities farther from the frame.

4. The electroacoustic device of claim 1, wherein
each of the plurality of partition nets comprises a support and a plurality of bars, wherein the support and the plurality of bars cooperatively define the plurality of net holes, and a distance between each two adjacent ones of the plurality of bars is smaller than a particle size of the sound absorption material in adjacent one of the plurality of cavities to prevent the sound absorption material from passing through the plurality of net holes.

5. The electroacoustic device of claim 4, wherein
an extending direction of the plurality of bars of the plurality of partition nets are substantially the same.

6. The electroacoustic device of claim 1, wherein
each of the plurality of partition nets has a plate configuration, and the plurality of partition nets are spaced apart from each other and arranged in parallel from the frame to the box.

7. The electroacoustic device of claim 1, wherein
the plurality of cavities have different volumes.

8. The electroacoustic device of claim 1, wherein
different ones of the plurality of cavities are filled with different types of sound absorption material.

9. The electroacoustic device of claim 1, wherein
different ones of the plurality of cavities are filled with sound absorption material with different particle sizes.

10. The electroacoustic device of claim 1, wherein
the frame comprises a side wall and a bottom all the bottom wall is connected to the box, and the leaking channel is set on the side wall.

11. The electroacoustic device of claim 10, wherein
the driving assembly comprises a first driving component connected to the vibrating membrane and a second driving component connected to the frame, and the second driving component is configured to drive the first driving component to vibrate so as to drive the vibrating membrane to vibrate.

12. The electroacoustic device of claim 11, wherein
the first driving component is a coil, the second driving component is a magnet and comprises a first part and a second part, the fist part is Connected to the bottom wall of the frame, the second part is disposed around the first part and spaced apart from the first part to form a magnetic gap, the first driving component extends from the vibrating membrane into the magnetic gap;
wherein
the second part is clung to the side wall of the frame, the second part defines a through hole which is aligned and communicated with the leaking channel; or
the second part is spaced apart from the side wall of the frame, an end of the second part is connected to the bottom wall of the frame and another end of the second part is spaced apart from the vibrating membrane.

13. An electroacoustic device, comprising:
a box having a bottom wall, a top wall and a side wall, wherein the top wall defines an opening;
a vibrating membrane connected to the top wall of the box and covering the opening;
a frame installed on the bottom all of the box, wherein the frame, the bottom wall of the box and the vibrating membrane cooperatively define a chamber, and the frame defines a leaking channel communicated with the chamber;
a driving assembly installed in the chamber and configured to drive the vibrating membrane to vibrate; and
a plurality of partition nets set inside the box and outside the chamber, wherein the plurality of partition nets, the top wall, the bottom wall and the side wall cooperatively define a plurality of cavities, at least one of the plurality of cavities is filled with sound absorption material, each of the plurality of partition nets defines a plurality of net holes, each of the plurality of net holes of each of the plurality of partition nets is small enough to prevent the sound absorption material from passing through the plurality of net holes, and the plurality of cavities are communicated with the chamber through the leaking channel.

14. The electroacoustic device of claim 13, wherein
a size of each of the plurality of net holes of one of the plurality of partition nets closer to the frame is larger than a size of each of the plurality of net holes of other ones of the plurality of partition nets farther from the frame; and
a particle sire of the sound absorption material in one of the plurality of cavities closer to the frame is larger than a particle size of the sound absorption material in other ones of the plurality of cavities farther from the frame.

15. The electroacoustic device of claim 13, wherein
each of the plurality of partition nets comprises a support and a plurality of bars, wherein the support and the plurality of bars cooperatively define the plurality of net holes, and a distance between each two adjacent one of the plurality of bars is smaller than a particle size of the sound absorption material in the adjacent one of the plurality of cavities to prevent the sound absorption material from passing through the plurality of net holes; and
an extending direction of the plurality of bars of the plurality of partition nets are substantially the same.

16. The electroacoustic device of claim 15, wherein
each of the plurality of partition nets has a plate configuration, and the plurality of partition nets are spaced apart from each other and arranged in parallel from the frame to the side wall of the box.

17. The electroacoustic device of claim 13, wherein
the plurality of cavities have different volumes; or
different ones of the plurality of cavities are filled with different types of sound absorption material; or
different ones of the plurality of cavities are filled with sound absorption material with different particle sizes.

18. The electroacoustic device of claim 13, wherein
the driving, assembly comprises a coil connected to the vibrating membrane and a magnet connected to the bottom wall of the box, and the magnet is configured to drive the first driving component to vibrate so as to drive the vibrating membrane to vibrate.

19. The electroacoustic device of claim 18, wherein
the magnet comprises a first pan and a second part, the second pan is disposed around the first part and spaced apart from the first part to form a magnetic gap, the coil extends from the vibrating membrane into the magnetic gap;
wherein
the second part is clung to the frame, the second part defines a through hole which is communicated with the leaking channel; or
the second part is spaced apart from the frame, an end of the second part is connected to the bottom wall of the box and another end of the second part is spaced apart from the vibrating membrane.

20. A mobile terminal, comprising:
a body; and
an electroacoustic device set inside the body, the electroacoustic device comprising:
 a box defining an opening;
 an electroacoustic component comprising a frame, a vibrating membrane and a driving assembly, wherein the frame is installed inside the box, the vibrating membrane is assembled on the frame and covers the opening, the frame and the vibrating membrane cooperatively define a chamber, the driving assembly is disposed in the chamber and is configured to drive the vibrating membrane to vibrate, and the frame defines a leaking channel passing through the frame and communicated with the chamber; and
 a plurality of partition nets set inside the box and outside the chamber, wherein a space between the electroacoustic component and the box is divided into a plurality of cavities by the plurality of partition nets, at least one of the plurality of cavities is filled with sound absorption material, each of the plurality of partition nets defines a plurality of net holes, and the plurality of cavities are communicated with the chamber through the leaking channel.

\* \* \* \* \*